Figure 9:
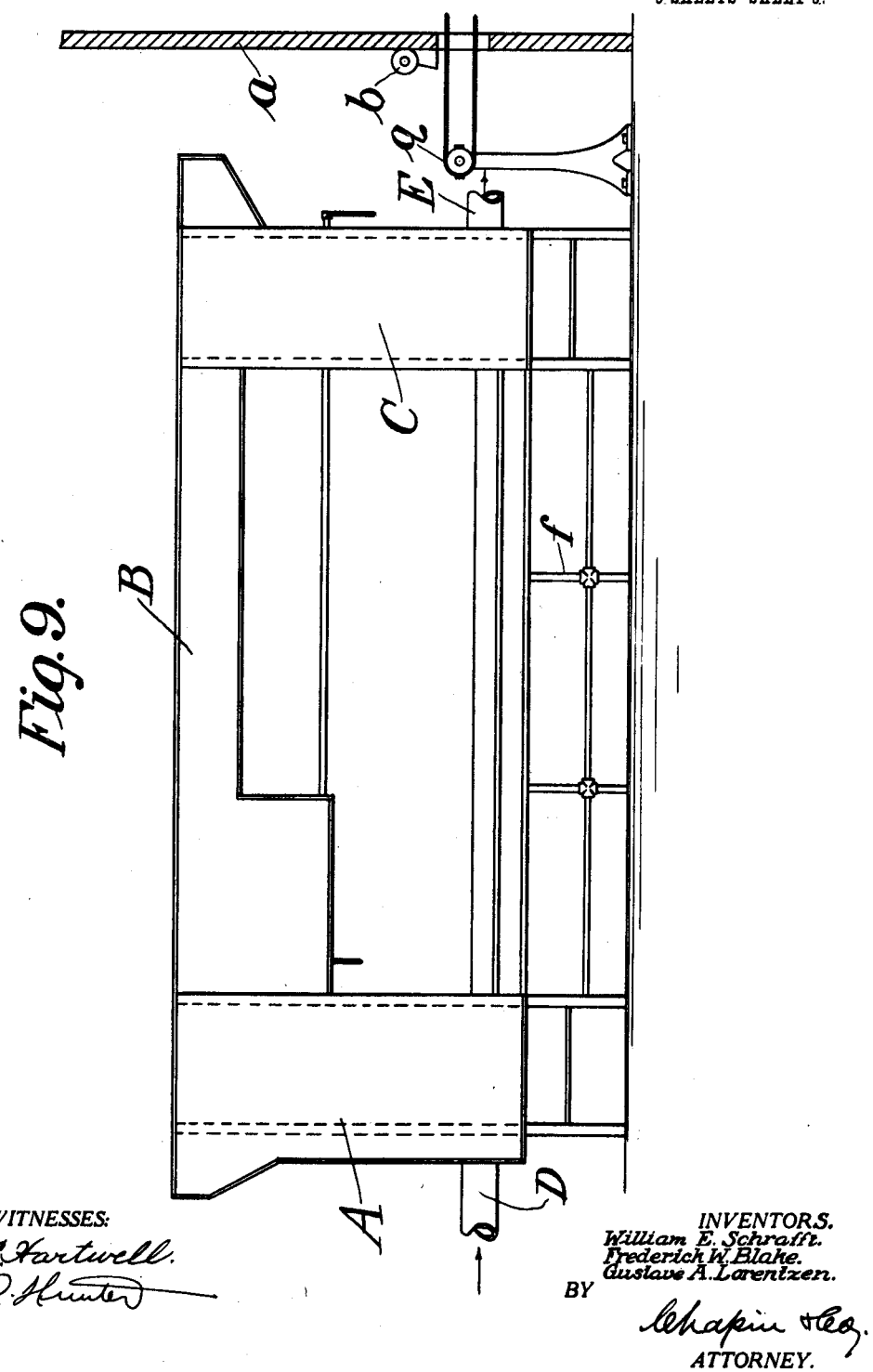

W. E. SCHRAFFT, F. W. BLAKE & G. A. LORENTZEN.
CANDY MAKING APPARATUS.
APPLICATION FILED MAR. 24, 1913.
1,123,934.
Patented Jan. 5, 1915.
5 SHEETS—SHEET 1.
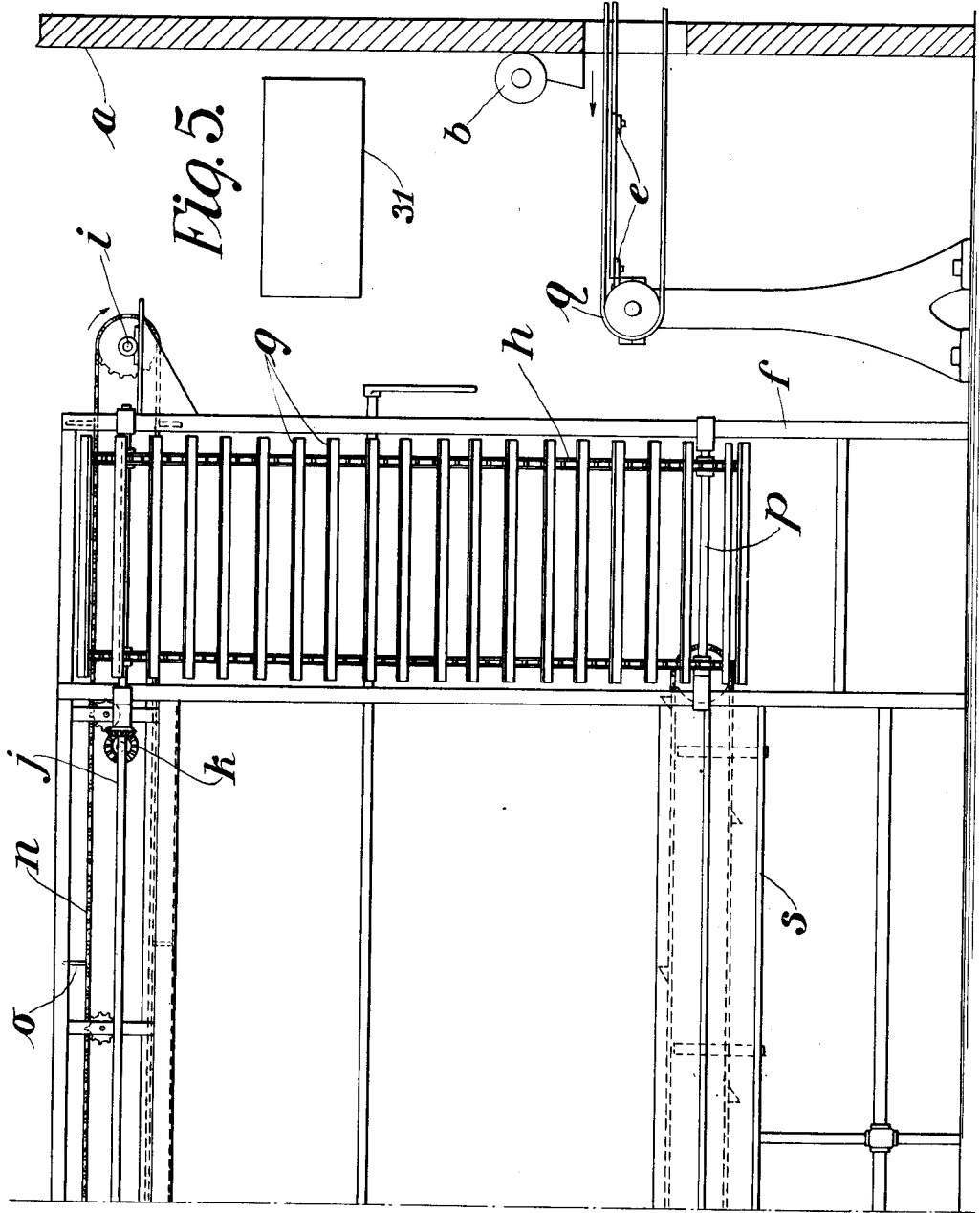
WITNESSES:
H. E. Hartwell
M. A. Hunter
INVENTORS.
William E. Schrafft.
Frederick W. Blake.
Gustave A. Lorentzen.
BY
Chapin Lea
ATTORNEY.

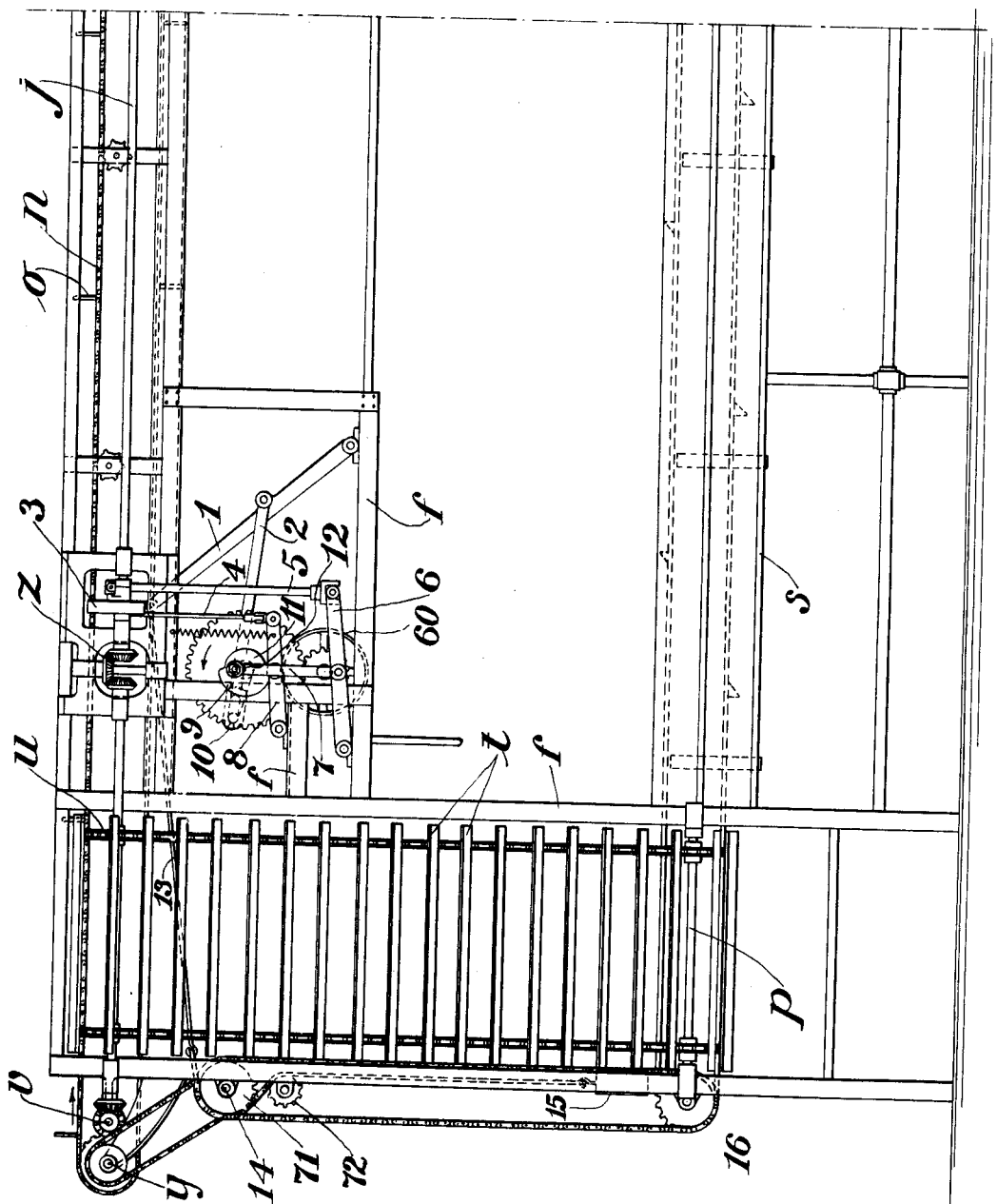

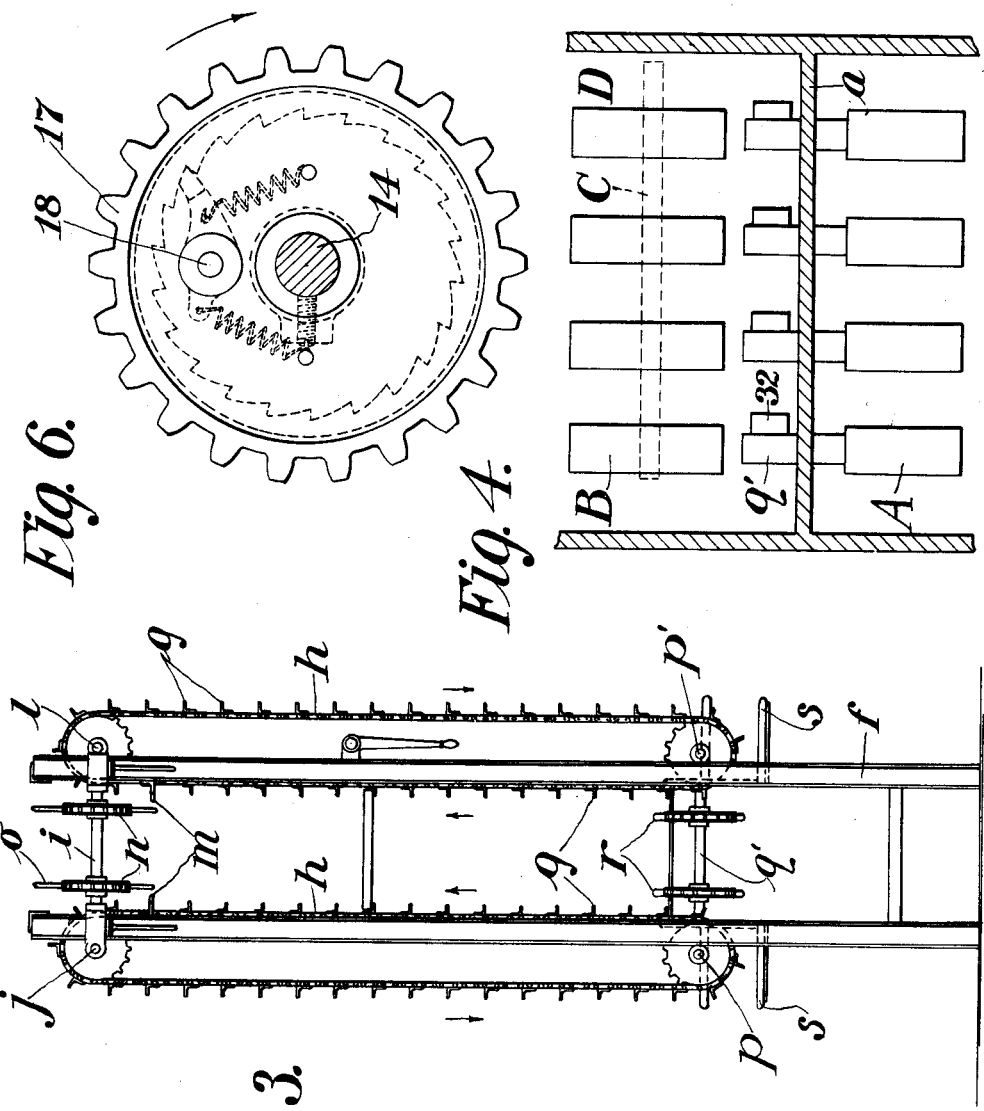

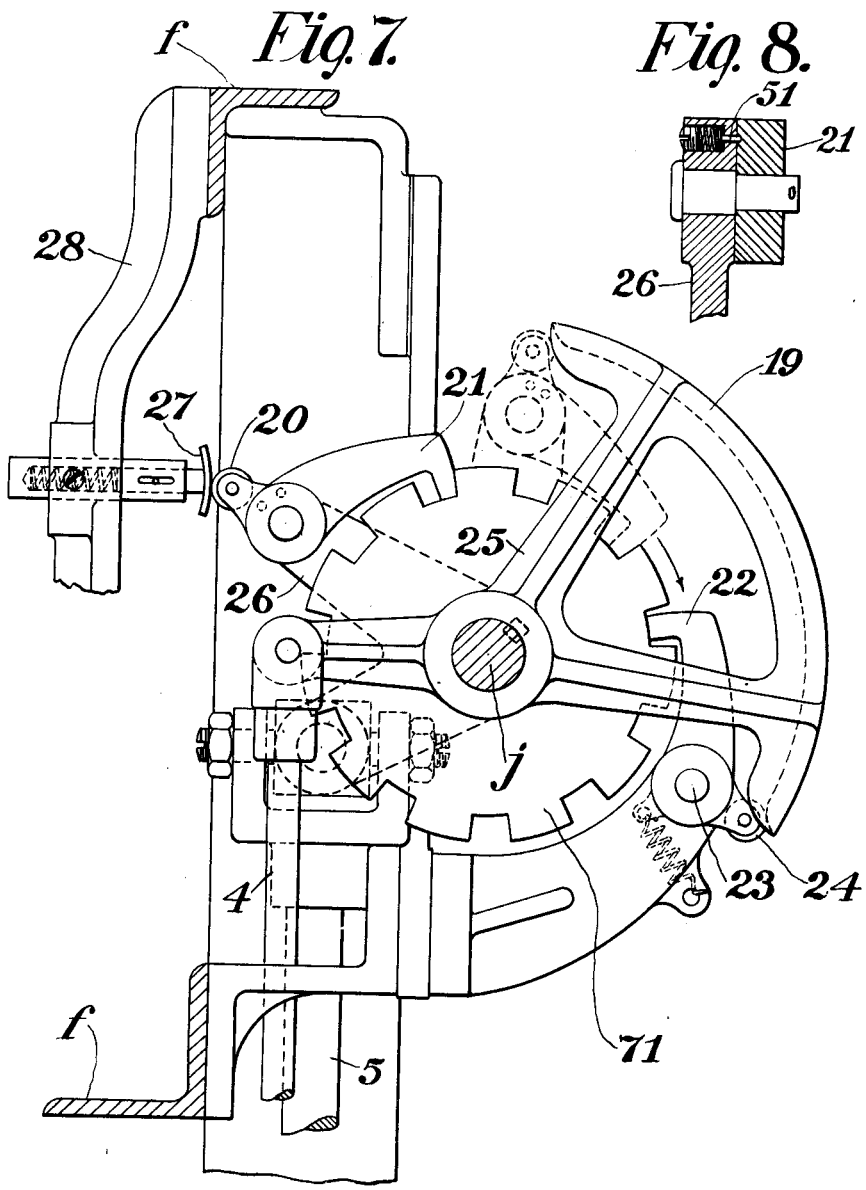

W. E. SCHRAFFT, F. W. BLAKE & G. A. LORENTZEN.
CANDY MAKING APPARATUS.
APPLICATION FILED MAR. 24, 1913.

1,123,934.

Patented Jan. 5, 1915.
5 SHEETS—SHEET 5.

WITNESSES:
H. E. Hartwell.
M. Q. Hunter

INVENTORS.
William E. Schrafft.
Frederick W. Blake.
Gustave A. Lorentzen.
BY
Chapin & Co.
ATTORNEY.

UNITED STATES PATENT OFFICE.

WILLIAM E. SCHRAFFT, OF SOMERVILLE, FREDERICK W. BLAKE, OF MEDFORD, AND GUSTAVE A. LORENTZEN, OF EAST BOSTON, MASSACHUSETTS, ASSIGNORS TO W. F. SCHRAFFT & SONS CORPORATION, OF BOSTON, MASSACHUSETTS, A CORPORATION OF MASSACHUSETTS.

CANDY-MAKING APPARATUS.

1,123,934.     Specification of Letters Patent.     Patented Jan. 5, 1915.

Application filed March 24, 1913. Serial No. 756,440.

*To all whom it may concern:*

Be it known that we, WILLIAM E. SCHRAFFT, FREDERICK W. BLAKE, and GUSTAVE A. LORENTZEN, citizens of the United States of America, residing at Somerville, county of Middlesex, at Medford, county of Middlesex, and at East Boston, county of Suffolk, respectively, all in the State of Massachusetts, have invented new and useful Improvements in Candy-Making Apparatus, of which the following is a specification.

This invention relates to an apparatus for use in candy making. It is especially adapted for use with a continuous candy-making machine, in which case it is desired to pack the candy output continuously and conveniently.

The object of the invention is to provide an apparatus combined with a continuous candy-making machine which will coöperate with the candy-making machine in cooling the candies and providing easy and efficient means for operators to pack the candy in a continuous manner.

Another object of the invention is to improve the details of construction of the cooling and packing apparatus in order to make the apparatus most convenient for the uses desired.

With these objects in view, the invention can best be understood from a consideration of the combination of the parts of the apparatus combined in the manner hereinafter described.

One preferred embodiment of the invention is shown for purpose of illustration, and this embodiment will be specifically described for a better understanding of the invention.

Referring to the drawings,—Figure 1 is a side elevation of the front part of the machine. Fig. 2 is a side elevation of the rear part of the machine. This figure is made separate from Fig. 1 for the reason that the first sheet is not large enough to accommodate a drawing to the desired scale. Fig. 3 is an end elevation of the apparatus from the front end of the machine. Fig. 4 is a plan view of a desired arrangement for the different sets of apparatus as arranged in the factory. Fig. 5 is a plan view of one of a series of trays adapted for use with the apparatus. Fig. 6 is a detail view showing the means for driving one of the shafts at the rear of the apparatus. Fig. 7 is a detail view of the ratchet-operating mechanism for driving one of the shafts. Fig. 8 is a detail view of the holding means applied to the ratchet-operating pawl. Fig. 9 is a view of the apparatus with the vertical and upper horizontal conveyers inclosed in a chamber through which cold air is passed to cool the candy.

The apparatus is shown as included in combination with a chocolate-coating machine which is of a well-known form, such as described in the Patent to Magniez, No. 735,890, August 11, 1903. This machine is shown as one type of a continuously-operating machine of large output. This chocolate-coating machine is arranged in a room at the right of the wall *a* (Fig. 1). A suitable opening through this wall *a* allows the delivery belt *q* of the candy-coating machine at the left of the wall *a* to pass. A fan *b* operates to direct a blast of air directly across the opening in the wall *a*. The room at the left of wall *a* is kept at a considerably lower temperature than the room at the right of the wall *a*, and the fan *b* is used to prevent the free circulation of air through the opening, which opening is necessary to allow the delivery-belt to pass from one room to another. The front end of the main part of the apparatus is arranged approximately in line with the belt *q* traveling from the candy-coating machine. As shown in Figs. 1 and 4, brackets *e* support a table 32 at one side of the belt *q*, on which table the trays, as 31, shown in Fig. 5, are adapted to rest. The coated candies travel along the belt *q* on what are called plaques, which are sheets of paper or other material adapted to hold the candy. An operator stands at the side of the table 32 and as each sheet of paper or plaque on which the coated candies rest on the belt *q* arrives in front of the table 32, the operator slides the sheet from the belt *q* to the tray 31 resting on the table. The tray is then inserted by the operator at the table on the supports, as angle-irons *g*, shown in Figs. 1 and 3. These supports or brackets are carried by chains *h* in a manner to be described. When the operator has placed a tray 31 filled with candy on the supports *g*, empty tray 31, which is resting on another set of the supports *g*, is slid away from said supports and placed on the table at the side of the conveying belt $q$ in order for the next sheet of paper or plaque containing the chocolates to be placed thereon. The empty plaque or sheet in this operation is removed from the tray and again used in the candy-coating machine. The supports $g$ travel upwardly in an intermittent manner, during which operation the operator, standing at the table as described, takes an empty tray from each pair of supports $g$ and replaces it with a full tray in the manner described. This operation is kept up in an intermittent manner as long as the apparatus is operating.

When the supports $g$ lift the trays to the upper end of the apparatus, in a manner to be described, chains $n$, which pass over the sprocket-wheels on the idle-shaft $i$, operate through projections $o$ carried by said chains to push the tray from the supports $g$ on the pair of tracks $m$. The chains $n$ operate through a determined distance while the supports $g$ and their carrying chains are at rest. Thus, when the supports $g$ present a tray in line with the tracks $m$ and there stop, the chain $n$ operates to slide the tray onto the tracks $m$. The trays, one after another, being presented by the supports $g$, are thus slid along the track $m$ from the upper, front end of the machine to the upper, rear end in what may be called their upper travel, which is through a considerable distance in order to allow time for the candies on the trays which are still warm to cool.

At the rear end of the machine, a series of supports $t$ are arranged with relation to the track $m$ in a similar manner to the supports $g$ already described. The operation of these supports $t$, however, carries the trays which are pushed thereon from the track $m$ downwardly instead of upwardly. When the trays have been carried into line with their lower horizontal travel, conveying chains, similar to chains $n$, passing over sprockets on the shafts $q'$ and 16 at the front and rear end of the apparatus, by means of projections $r$ thereon, carry the trays one after another away from the supports $t$.

Arranged along the line of travel from the lower rear end to the front end of the machine are tables $s$ (see Fig. 3) alongside of which candy packers work. As each tray passes the tables $s$ on its lower travel, the packers remove the candies from the tray and pack them in boxes suitably placed on the tables $s$. The candies at this point have had sufficient time to cool for packing. The apparatus operates intermittently so that the packers have a definite allowed time in which to remove the candy from the filled trays; thus they must necessarily operate at a required speed to keep the apparatus in operation successfully. After the trays have been emptied by the packers, they continue along their lower travel and are again automatically slid on the supports $g$ which carry them upwardly until removed by the operator standing beside the travel belt of the candy-making machine, as previously described. The complete cycle of general operations has now been described, and the manner in which the several parts operate will be described.

The upper travel of the trays along the track $m$ is controlled by two chains $n$ passing over sprocket-wheels on the shaft $i$ and on the shaft $y$, the latter being the driving-shaft for these chains. The lower travel of the trays is controlled by similarly-arranged chains passing over sprocket-wheels on the shaft 16 and on the shaft $q'$, the shaft 16 being the driving-shaft for this set of chains. The upward and downward travel of the trays can best be understood by reference to Figs. 1, 2, and 3. The shaft $j$ extends the whole length of the machine, as indicated in Figs. 1 and 2, and shaft $l$ is, a driven-shaft which is operated through the beveled gearing $k$ from the shaft $j$ and extends only through the vertical cross-pieces of the frame $f$, in order to support the sprockets on which the chains $h$ run. As seen in Fig. 3, chains $h$, carrying supports $g$, pass over sprockets on shaft $j$—$p$ and $l$—$p'$. The chains $u$ at the rear end of the machine run over sprockets on the shafts $j$ and $p$, and the other pair run on sprockets, not shown in the figure, which correspond to shafts $l$ and $p'$, shown in Fig. 3. These shafts (not shown) are operated from the shaft $j$ through the beveled gearing $v$ in an obvious manner.

The shaft $j$ is operated from the driving pulley 60 through a gear-train 10, rod 7, and lever connection 6 and 5, the latter operating a ratchet mechanism to be described. As seen in Fig. 2, the lever 6 is pivoted at its rear end to the frame $f$ and at an intermediate point to rod 7. The other end of the rod 7 is pivoted off center to gear 10. At the outer end of the lever 6 is a lever 5 which operates the ratchet mechanism, noted generally by 3, to give the shaft $j$ an intermittent rotation in a manner best understood from an inspection of Fig. 7. When the lever 5 is raised by means of the rod 7 and the connections described, it will be seen from Fig. 7 that the bell-crank lever 26, loosely pivoted on the shaft $j$, will move the pawl 21 to operate the ratchet 71, which is fast to the shaft $j$, and thus move this ratchet-wheel a distance of about two teeth, as indicated by the dotted line position of the pawl 21 as compared to the full line position thereof in Fig. 7. In order to make the operation of ratchet 71 positive, a locking pawl 22 is operated in connection with pawl 21 as follows: The lever 4 (see Fig. 2) is operated by means of a cam 9 mounted on the same center with the gear 10. This cam operates through a lever 8 pivoted to the frame to raise and lower the lever 4. The lever 4 operates a bell-crank lever 25, seen in Fig. 7, which rocks loosely on the shaft $j$. The cam operating the rod 4 is so designed with relation to the operation of the rod 7 that the bell-crank 25 will operate with relation to the bell-crank 26, as will be described. Thus, referring to Fig. 7, assuming that the operating pawl 21 is in the dotted line position shown, the bell-crank 25, which has a curved track 19 adapted to operate on the rollers 24 and 20, has just started to move counter-clockwise, whereupon the track allows the locking pawl 22, by means of its spring, to enter between the teeth of the ratchet 71 and lock the same in position. The continued movement counter-clockwise causes the track 19 on the bell-crank lever 25 to engage the roller 20 and lift the operating-pawl 21 out of engagement with the ratchet-wheel. The bell-crank lever 26 then operates to turn counter-clockwise until the roller 20 strikes spring-pressed stop 27, mounted on the bracket 28 on the frame $f$ which causes the operating pawl 21 to again engage between the ratchet-wheel. A small spring-pressed plunger 51 mounted in the end of the bell-crank lever 26 coöperates with two small recesses in the hub of the pawl 21 so that the pawl is held in one or the other of its engaged or disengaged positions. The track 19 moves the pawl 21 into one position and the yielding spring-stop 27 moves it into its other position, all as clearly shown in Figs. 7 and 8. While the bell-crank lever 26 is turning to the left, bell-crank lever 19 is turning to the right, and just before the bell-crank lever 26 starts to turn to the right in its next operation, the track 19 engages the roller 24 and lifts the locking-pawl 22 out of engagement with the ratchet-wheel, whereupon the cycle of operations is repeated. These operations cause an intermittent rotation of the shaft $j$ which is so geared with the sprocket-wheels carrying the chains, as aforesaid, to cause all the trays to be moved by the chains one step forward.

The means for operating the chains $h$ and $u$ on each end of the machine will now be described. Referring to Fig. 2, the lever 1 is pivoted at its lower end to the frame $f$, and, on its upper end, has attached thereto a flexible connection 13 which connects with a chain 71 passing over a sprocket 17, shown in detail in Fig. 6, which is loosely mounted on the shaft 14. After the chain 71 passes around this sprocket 17, it is directed in by the idle-sprocket 72, shown in Fig. 2, and attached to a weight 15. At an intermediate point of the lever 1, a lever 2 is pivoted, which is operated by a crank 10 connected at its outer end to the lever 2 and at its inner end to the shaft of the gear 10. As this gear 10 moves, the lever 1 passes from an extreme left-hand position to an extreme right-hand position, during which time it will cause the chain 71 to turn the shaft 14 in a manner indicated in Fig. 6. If the sprocket 17 is rotated contrary to the arrow in Fig. 6, it will be seen that the pawl mounted at 18 on the face of the sprocket-wheel 17 will ride over the teeth on a suitable disk arranged in connection with the sprocket 17 and pinned to shaft 14, as shown in Fig. 6, and the shaft 14 will not be driven. A rotation of sprocket-wheel 17 in the direction of the arrow will cause a rotation of the shaft in the same direction, due to the construction described. Thus, when the lever 1 moves to the extreme right-hand position, the weight 15 is lifted and the chain 71 causes the shaft 14 to be turned the desired amount. When the lever 1 returns to its left-hand position, the weight merely causes the ratchet to turn without any turning of the shaft 14. The turning of the latter is, therefore, intermittent. To the shaft 14 by means of a chain connection the shaft $y$ and the shaft 16. Thus, the shaft 14 gives an intermittent rotation to the shafts $y$ and 16 which operate the chains of the conveying mechanism in a manner as before described. The operation of the crank 10 is arranged to throw the lever 1 to the right at a time when the operating pawl 21 of the ratchet-wheel 71 is returing after operating the shaft $j$. Thus, the shaft $j$ is turned when the shaft 14 is stationary, and the shaft 14 is turned when the shaft $j$ is stationary, all of which gives the horizontal movements of the conveyer, which are, in their upper and lower travel, a step-by-step movement, alternating with the upward and downward movement of the chains $u$ and $h$.

In Fig. 9 the apparatus is illustrated in an efficient form, in which the vertical conveyers as well as the top horizontal conveyer are inclosed in a casing A, C, and B, respectively. Through a pipe D at one end of the machine cold air is forced by a suitable fan in the direction of the arrow. This cold air travels in a direction through the casing A, B and C opposite to the movement of the goods therethrough, thus cooling the goods in an efficient manner. The air leaves the casing C through the pipe E and preferably returns to the refrigerating apparatus (not shown) to be again cooled and forced through the pipe D. By the use of the apparatus shown in Fig. 9, it is unnecessary to keep the room at the left of wall $a$ at as low a temperature as would otherwise be the case, thus resulting in a saving in the operation of the refrigerating plant.

When the machine is operating, the product of the coating or other machine in the room at the right of wall *a* is delivered to the machine in the room at the left of the wall *a*, through which machine the product travels a sufficient distance in at cooling temperature to be cooled and ready for packing when it reaches the positions occupied by the packers. A bank of the coating machines A is preferably arranged with a bank of the packing machine B in a manner indicated in Fig. 4. When the packers fill their boxes the latter are placed on a suitable cross-conveyer C which runs crosswise between the upper and lower travel of the conveying means in the packing machines. The filled boxes are by this means delivered to a point D, where other packers may assemble the proper number of boxes and pack them in a shipping case. The arrangement as outlined has been found a most efficient one, saving a large amount of labor and floor space heretofore necessary for the work.

While applicants have described the preferred embodiment of their invention, the same is not limited to the one form shown, but may be adapted in various forms without departing from the scope of the invention.

What we claim, is,—

1. An apparatus of the class described, comprising, in combination, a series of removable trays, means arranged to move said trays in an upper and lower horizontal path, the movement of the trays in the two paths being in opposite directions, other means arranged to transfer the trays from the lower to the upper path and from the upper to the lower path, a driving device for the first-mentioned means, and a driving device for the second-mentioned means, said devices being constructed and arranged to operate intermittently and each to operate in alternate time relation with the other, whereby the movement of the trays in their upper and lower travel takes place during the interval between movements of the trays in their downward and upward travel, all for the purpose described.

2. An apparatus of the class described, comprising, in combination, a frame having upper and lower supports arranged one over the other for a series of removable trays, a series of trays constructed to rest in said supports, conveying means constructed to move said trays from one end of said supports to the other, two vertical conveying means, one arranged at each end of the said supports, one constructed to receive one tray after another from the lower support and deliver them in position to be moved onto the upper support, and the other constructed to receive the trays, one after another, from the upper support and deliver them into position to be moved onto the lower support, and driving devices constructed and arranged to drive the vertical conveyers in an intermittent manner and drive said conveying means in an intermittent manner with an alternating time relation to the driven movement of the vertical conveyers, all for the purpose described.

3. An apparatus of the class described, comprising a frame, two sets of conveyers operably mounted therein, one set of conveyers arranged one above the other and the other set of conveyers arranged vertically to connect the conveyers of the first set, a series of trays arranged to be carried by said conveyers through a cycle of movement, said conveyers being constructed to pass the trays from one to another in an automatic manner, two sets of driving devices, one for each set of conveyers, arranged to drive its set of conveyers while the other set is stationary, whereby the trays are transferred from one set of conveyers while in motion to the other set of conveyers while at rest, all for the purpose described.

4. An apparatus of the class described, comprising a frame, two horizontal conveyers operably mounted therein, one arranged above the other, driving means operable to drive both conveyers in unison, two vertical conveyers connecting the two horizontal conveyers at the opposite ends thereof, driving means for said vertical conveyers operable to drive them in opposite directions, both of said conveyer driving means being constructed and arranged to operate intermittently, the operation of one alternating with the operation of the other, all for the purpose described.

5. An apparatus of the class described, comprising in combination, a frame having therein two horizontal conveyers, one located above the other, two vertical conveyers connecting the horizontal conveyers at opposite ends thereof, a packing table arranged along the path of the lower horizontal conveyer, a series of removable trays adapted to be moved one after the other by said conveyers, one of said conveyers being arranged to allow the convenient removal and insertion of each of said trays, driving devices arranged to move said conveyers in a direction to carry said trays from the point at which they are inserted first to the upper horizontal conveyer along the length of that conveyer to the end vertical conveyer and then to the lower horizontal conveyer, whereby the trays reach the packing table after passing through the greater part of travel through the frame from the point where they are inserted, thus allowing time for any warm articles placed on the trays to be cooled before reaching the packing table.

6. An apparatus of the class described, comprising a candy-coating machine, a frame having therein a series of conveyers, a series of trays adapted to receive the product from said machine and be inserted in the conveyers in the frame, a packing table arranged adjacent one of the conveyers, driving devices to move the conveyers when the trays have been inserted therein in a direction to carry the trays through the greater part of the conveyers' path before they reach the packing table, all for the purpose described.

7. Apparatus of the class described, comprising, in combination, a series of candy-coating machines, a series of packing frames, one arranged adjacent to each of said machines, each frame having a series of conveyers therein and a packing table adjacent thereto, a series of trays for each packing frame adapted to receive the product from the adjacent machine and carrying it to the packing table, driving means for said conveyers in each frame whereby the trays are moved to the packing table of the frame through a distance in their frame sufficient to allow time for the product on the trays to cool before reaching the packing table, and a conveyer connecting the several packing tables on which the packed product may be placed from each packing frame, said conveyer leading to a central point where the product of all machines may be assembled, all for the purpose described.

8. An apparatus of the class described, comprising conveying means constructed and arranged to operate in a complete cycle, driving devices to operate said conveying means, a casing arranged around the greater part of the travel of the conveying means constructed and arranged to serve as a conduit for a temperature-controlling medium, whereby the temperature of goods carried in said conveying means may be changed as they pass to the desired point, all for the purpose described.

9. An apparatus of the class described, comprising in combination, a frame, two horizontal conveyers operably mounted therein, arranged one above the other, driving means operable to drive both conveyers simultaneously and in opposite directions with a step by step movement, two vertical conveyers, operably mounted in said frame, driving means operable to drive said vertical conveyers simultaneously and in opposite directions with a step by step movement, said horizontal conveyers arranged to move during the interval of rest of said vertical conveyers.

WILLIAM E. SCHRAFFT.

Witnesses:
EDGAR H. SAVAGE,
L. MAE FORD.

FREDERICK W. BLAKE.
GUSTAVE A. LORENTZEN.

Witnesses:
EDGAR H. SAVAGE,
SAMUEL SIDLOFSKY.